US005439729A

United States Patent [19]

Kawakami et al.

[11] Patent Number: 5,439,729

[45] Date of Patent: Aug. 8, 1995

[54] TRANSFER METALLIZING FILM AND SHEET

[75] Inventors: Kenichi Kawakami, Abiko; Katsuhiro Tsuchiya, Kusatsu; Hideo Maruhashi, Funabashi, all of Japan

[73] Assignee: Toray Industries, Inc., Japan

[21] Appl. No.: 87,796

[22] PCT Filed: Dec. 25, 1991

[86] PCT No.: PCT/JP91/01762

§ 371 Date: Jul. 14, 1993

§ 102(e) Date: Jul. 14, 1993

[87] PCT Pub. No.: WO93/12941

PCT Pub. Date: Jul. 8, 1993

[51] Int. Cl.[6] .............................................. B32B 15/08

[52] U.S. Cl. .................................... 428/141; 428/409; 428/461; 428/523

[58] Field of Search ................ 428/141, 409, 461, 523

[56] References Cited

U.S. PATENT DOCUMENTS 4,725,466 2/1988 Crass et al. ........................... 428/35
4,777,081 10/1988 Crass et al. .......................... 428/215
4,875,963 10/1989 Paschke et al. ..................... 156/249
4,912,091 3/1990 Bothe et al. ........................ 428/35.2
5,096,630 3/1992 Bohme et al. .......................... 264/22
5,110,670 5/1992 Janocha et al. ..................... 428/216

FOREIGN PATENT DOCUMENTS 55-135693 10/1980 Japan .
62-282995 12/1987 Japan .

*Primary Examiner*—William P. Watkins, III
*Attorney, Agent, or Firm*—Austin R. Miller

[57] ABSTRACT

A transfer metallizing film which permits formation of a beautiful and smooth metal transfer layer with thunder mark suppressed and which is used for realizing a transfer metallizing sheet superior in the transferability of the metal transfer film. The film includes a polypropylene resin film not larger than 5 kV in the amount of static electricity and has a transfer surface. The transfer surface has a surface roughness set at a value not larger than 0.1 μm and also has an atomic construction ratio of the number of oxygen atoms to that of carbon atoms within 10 nm from the surface of 0~0.03. The other side of the film has an atomic construction ratio of the number of oxygen atoms to that of carbon atoms within 10 nm from the surface of 0.1~0.5.

4 Claims, 1 Drawing Sheet

TRANSFER METALLIZING FILM AND SHEET

FIELD OF THE INVENTION

The present invention relates to a film and a transfer metallizing sheet, especially a transfer metallizing film having a transfer, surface for releasable lamination of a metal transfer layer thereto, and a transfer metallizing sheet having such film.

PRIOR ART

As a wrapping paper for food which is apt to be affected by humidity such as chewing gum, there is used a wrapping paper having a metal deposited layer for the prevention of humidity. This wrapping paper is produced by vapor-depositing a metal, e.g. aluminum, on paper for wrapping use. However, if a metal is vapor-deposited directly onto paper for wrapping use, the gloss of the resulting metal-deposited layer is not good and it is impossible to obtain a beautiful wrapping paper. To avoid this inconvenience, as a method for producing a wrapping paper having a metal-deposited layer, there has been adopted a method in which a resin film having a metal-deposited layer (hereinafter referred to as "transfer metallizing sheet") is provided, and the metal layer of the transfer metallizing sheet is transferred onto paper for wrapping use.

Heretofore, as the resin film used in the preparation of the above transfer metallizing sheet, there has been known the polypropylene resin film described in U.S. Pat. No. 4,777,081. Said polypropylene resin film has a three-layer structure comprising a core layer and coating layers formed on both sides of the core layer, the viscosity of the coating layers being set lower than that of the core layer. For improving the electricity suppressing property of the film, an organic material of a low molecular weight such as, for example, a mixture of stearic amide and alkylamine, is incorporated in the core layer.

In such transfer metallizing film, a metal is vapor-deposited on the surface of each coating layer to form a metal layer to be transferred (i.e. metal transfer layer), and this film is used as a transfer metallizing sheet.

In the above known transfer metallizing film, however, the flatness of the coating layer surface is not good. Therefore, when the metal transfer layer of the transfer metallizing sheet prepared using the known film is transferred onto a receptor, the surface roughness of the coating layer is reflected on the surface of the metal transfer layer thus transferred.

In the known film, moreover, the transferability of the metal transfer layer is not good because the bonding strength between the coating layer and the metal transfer layer becomes too high.

Further, since the known film is not satisfactory in its electricity suppressing property, a lightning discharge is apt to occur and consequently a thunder mark is easily formed on the transferred metal transfer layer.

OBJECT OF THE INVENTION

In a first aspect of the present invention, it is the object to provide a transfer metallizing film which permits the formation of a beautiful and smooth metal transfer layer with suppressed thunder mark and which is for realizing transfer metallizing sheet superior in the transferability of the metal transfer layer.

In a second aspect of the present invention, it is an object to provide a transfer metallizing sheet using the transfer metallizing film according to the first aspect of the invention.

SUMMARY OF THE INVENTION

The transfer metallizing film according to the first aspect of the present invention has a transfer surface for releasable lamination of a metal transfer layer thereto. It is constituted by a polypropylene resin film not more than 5 kV in the amount of static electricity. As to the transfer surface of the film, the surface roughness is set at a value of not larger than 0.1 μm: and an atomic construction ratio of the number of oxygen atoms/the number of carbon atoms within 10 nm from the surface is set at 0∼0.03. As to the other side of the sheet base, such atomic construction ratio within 10 nm from the surface is set at 0.1∼0.5.

PREFERRED EMBODIMENTS OF THE INVENTION

Figure 1:
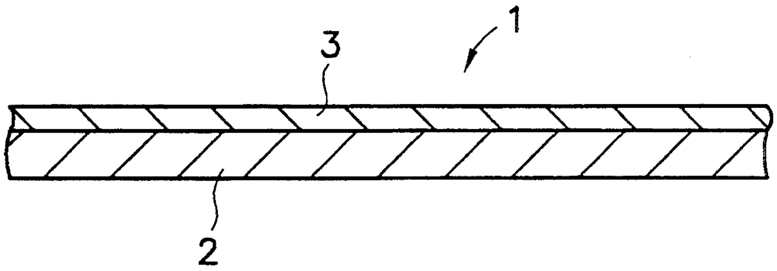
FIGS. 1 and 2 are partial, longitudinally sectional views each showing an example of a transfer metallizing sheet according to a second aspect of the present invention.

The transfer metallizing film according to the present invention is a single layer of a polypropylene resin film or a laminate of two, three or more layers of polypropylene resin films.

As examples of the polypropylene resin film used in the present invention there are mentioned films of propylene homopolymer, copolymers of propylene and α-olefins such as ethylene, butene, 4-methylpentene and octerie, random, block and graft copolymers of propylene and unsaturated carboxylic acids such as acrylic acid and maleic arthydride or derivatives thereof, and mixtures of these polypropylene resins.

In the polypropylene resin just exemplified above which constitutes the polypropylene resin film used in the present invention there may be incorporated inorganic particles such as, for example, silica, calcium carbonate and sodium aluminosilicate (zeolite), organic substances such as, for example, oleic amide, stearic amide, erucic amide, stearic acid monoglyceride, stearic acid triglyceride, hydroxy-fatty acid amine, hydrogenated castor oil, amino-fatty acid sodium salt, betaine compounds, N,N-bishydroxyethylalkylamine and silicon compounds, as well as nucleating agent, lubricant, antistatic agent, antioxidant, heat stabilizer, ultraviolet inhibitor and ultraviolet absorber. Particularly, the addition of silica, oleic amide, stearic amide, erucic amide and stearic acid monoglyceride, in adjusted amounts, permits adjustment of the transferability of a metal transfer layer.

These films may be stretched uniaxially or biaxially. In the present invention, it is desirable to use a biaxially stretched polypropylene resin film from the standpoint of rigidity. In the case where the film used in the invention is constituted by a laminate of polypropylene resin films, it is optional whether the polypropylene resin films are of the same kind or of different kinds. As to the thickness of the polypropylene resin film(s), 10 to 40 μm is preferred in the case of a single layer, while in the case of a laminate, it is preferable that the thickness of the base portion be set at 10–30 μm and that of the coating layer portion at 0.5–10 μm. Outside these thickness ranges, it would be impossible to obtain a satisfactory rigidity of the film(s).

In the present invention, the amount of static electricity of the polypropylene resin film is set at not larger than 5 kV. If it exceeds 5 kV, a lightning discharge is apt to occur at the time of unwinding of the film. As a result, when a metal transfer layer is transferred onto a receptor, a thunder mark is easily formed on the metal transfer layer thus transferred. The amount of static electricity of the polypropylene resin film can be adjusted by destaticizing the film using a destaticizer or an eliminator. The amount of static electricity as referred to herein indicates a value obtained by measurement using a static electricity measuring device.

In the transfer metallizing film according to the present invention, a metal transfer layer is laminated releasably onto one side ("transfer surface" hereinafter) of the polypropylene resin film to form a transfer metallizing sheet. The surface roughness of the transfer surface is set at a value of not larger than 0.1 μm. If it exceeds 0.1 μm, the metal transfer layer which has been transferred onto a receptor will be poor in flatness. The surface roughness as referred to herein indicates an average surface roughness as measured with cut-off set at 0.25 mm according to JIS-B-0601.

In the present invention, moreover, an atomic construction ratio (O/C) of the number of oxygen atoms (O) to that of carbon atoms (C) within 10 nm from the transfer surface is set at 0~0.03. If the O/C value exceeds 0.03, the bonding strength between the transfer surface and the metal transfer layer will become too high, thus resulting in that the transferability of the metal transfer layer is deteriorated. Particularly, in the case where the sheet base according to the present invention is used repeatedly, the transferability of the metal transfer layer is deteriorated with increase in the number of times of such repeated use. At an O/C value exceeding 0.03, moreover, a vapor deposition mark like lightning may occur on the transfer surface when the other side of the polypropylene resin film is subjected to a discharge treatment to an excess degree, and this vapor deposition mark sometimes remains on the metal transfer layer after transfer. The atomic construction ratio of the transfer surface can be set within the foregoing range by subjecting the transfer surface to a corona discharge treatment.

The atomic construction ratio O/C as referred to herein indicates a value obtained by electron spectroscopy for chemical analysis (ESCA) using X-ray. More specifically, a measurement is made for the transfer surface, using an ESCA spectrometer, and from the resulting spectrum there are obtained an area of peak (C) representing the number of carbon atoms and that of peak (O) representing the number of oxygen atoms, then the area of O is divided by the area of C and the result is used as a value of O/C. The following are measurement conditions:

① Exciting X-ray: Mg Kα 1.2 ray
② Photoelectron escape angle: 90°
③ Bond energy value of CIS: 282.6 eV main peak In the present invention, moreover, the atomic construction ratio (O/C) within 10 nm from the surface of the other side of the polypropylene resin film is set at 0.1~0.5. If the O/C value is smaller than 0.1, this means a reduced number of oxygen-containing polar groups which exhibit an electricity suppressing effect, and hence the same effect of the film is deteriorated. Conversely, if the O/C value exceeds 0.5, the bonding strength with respect to a metal layer or the like becomes too high, resulting in that, for example when the transfer metallizing film of the invention with the metal transfer layer vapor-deposited on the transfer surface is taken up, the metal transfer layer is transferred onto the back side of the sheet and therefore drop-out of the metal transfer layer is apt to occur.

The atomic construction ratio of the other side of the polypropylene resin film can be set within the aforementioned range by the application of a corona discharge treatment, like the transfer surface. This ratio is a value obtained by measurement according to the same method as in the measurement of the transfer surface.

An example of a method for producing the transfer metallizing film of the invention will be described below.

First, the polypropylene resin described above is fed to an extruder, whereby it is melted and extruded in the form of film from a die. The polypropylene resin thus extruded is wound round a cooling drum to prepare film. In the case where the sheet base of the invention is to be constituted by a laminate film, there is adopted, for example, a co-extrusion method to prepare the laminate film. The film thus formed is introduced into an oven and stretched to 3 to 7 times its original length in the longitudinal direction while being heated. Then, the film thus stretched longitudinally is conducted into a tenter and stretched to 5 to 15 times its original width in the transverse direction under heating. The film thus stretched longitudinally and transversely is than subjected to a heat relaxation treatment as necessary to obtain a biaxially oriented film.

Next, a corona discharge treatment is applied to both sides of the biaxially oriented film thus obtained. In this case, conditions for the corona discharge treatment are set so that the transfer surface and the other side of the film satisfy the foregoing atomic construction ratios. It is preferable that the corona discharge treatment be conducted in a gaseous mixture atmosphere of nitrogen gas and carbon dioxide gas in order to satisfy both required adherence and transferability of the transfer surface.

Then, the biaxially oriented film which has been subjected to the corona discharge treatment is destaticized to set the amount of static electricity of the film to a value of not larger than 5 kV. The destaticizing operation for the film can be done, for example, by using an ion blowing type destaticizer or eliminator.

In the above biaxially oriented film preparing process, the surface roughness of the transfer surface can be set within the foregoing range by adjusting the heating temperature and cooling temperature at each stage of the process. More specifically, it is preferable that the polypropylene resin extrusion temperature be set in the range of 200° to 300° and the cooling drum temperature in the range of 20° to 100° C. The heating temperature during the longitudinal stretching and that during the transverse stretching are preferably in the ranges of 100° to 150° C. and 150° to 190° C., respectively. Further, the temperature of the heat relaxation treatment is preferably in the range of 140° to 170° C. If the temperatures thus set are outside these ranges, the surface roughness of the transfer surface is apt to exceed 0.1 μm.

As will be described below in detail in connection with the second aspect of the present invention, a metal transfer layer is laminated onto the transfer surface of the transfer metallizing film of the invention to form a transfer metallizing sheet.

The transfer metallizing sheet according to the second aspect of the present invention has the transfer metallizing film according to the first aspect of the invention and a metal transfer layer formed releasably on the transfer surface of the film.

FIG. 1 is a partial, longitudinal sectional view showing an example of a transfer metallizing sheet according to the present invention. In the same figure, the transfer metallizing sheet, indicated at 1, is constituted by a laminate of the transfer metallizing film according to the fist aspect of the present invention and indicated at 2 and a metal transfer layer 3.

The metal transfer layer 3 is laminated to the transfer surface side of the film 2. The thickness, optical density and film resistance of the metallized transfer layer 3 are preferably 10–500 nm, 1–3, and 1–10Ω, respectively.

The transfer metallizing sheet 1 can be produced by vapor-depositing a metal onto the transfer surface of the film 2 according to the first aspect of the invention. As examples of the metal to be used for the vapor deposition, mention may be made of aluminum, zinc, nickel and chromium. The metal deposition method is not specially limited. There may be used any of known methods such as, for example, batchwise vacuum deposition, continuous air deposition, electric heating, the use of ion beam, sputtering, and ion plating.

The transfer metallizing sheet of the invention is used for the production of a food wrapping paper having a metal layer, for example. More particularly, first a receptor sheet such as a wrapping paper onto which the metallized transfer layer is to be transferred is provided. Then, an adhesive is applied to the surface of the receptor sheet thus provided and then dried. As the adhesive there is used an acrylic or urethane-based adhesive. Next, the metallic film transfer sheet and the receptor sheet are lapped against each other in such a manner that the adhesive layer of the receptor sheet and the metal transfer layer of the transfer metallizing sheet confront each other. Then, the transfer metallizing sheet and the receptor sheet are compression-bonded together, whereby the metal transfer layer is bonded to the adhesive layer of the receptor sheet. Thereafter, the film is peeled and removed from the metallic transfer film, whereby the metal transfer layer is transferred to the receptor sheet side. In this way there is obtained a wrapping paper having the metal layer.

In such wrapping paper production, the transfer of the metal transfer layer can be done easily because the transfer metallizing sheet is provided with the transfer metallizing film according to the first aspect of the present invention. Further, the metal transfer layer which has been transferred onto the wrapping paper is suppressed in the formation of thunder mark and is superior in smoothness.

For example, the wrapping paper thus obtained is used for wrapping food which is apt to be affected by humidity.

Figure 2:
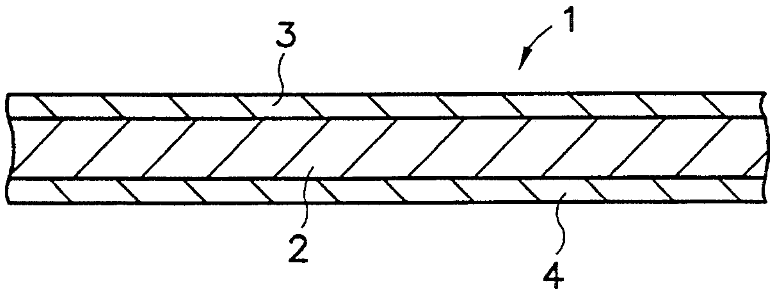

In the transfer metallizing sheet 1, as shown in FIG. 2, a metal layer 4 may be laminated to the back (the underside in the figure) of the film 2. The transfer metallizing sheet 1 having the metal layer 4 is further superior in the electricity suppressing property. Besides, when the sheet 1 is wound up or laminated, it is possible to prevent the metal transfer layer 3 from being transferred onto the back of the film 2, and hence the dropout of the film 3 is difficult to occur. The metal layer 4 is formed by the vapor deposition of a metal like the metal transfer layer 3. The vapor deposition of the metal layer 4 is performed simultaneously with or after the vapor deposition of the metal transfer layer 3.

The transfer metallizing film according to the first aspect of the present invention is constituted by such polypropylene resin film as described above. According to the present invention, therefore, it is possible to form a beautiful and smooth metal transfer layer with thunder mark suppressed, and there is obtained a metallizing transfer metallizing film capable of realizing a transfer metallizing sheet superior in the transferability of the metal transfer layer.

The transfer metallizing sheet according to the second aspect of the present invention is provided with the transfer metallizing film according to the first aspect of the invention. According to the present invention, therefore, it is possible to form a beautiful and smooth metal transfer layer with thunder mark suppressed and also possible to realize a transfer metallizing sheet superior in the transferability of the metal transfer layer.

EXAMPLES

EXAMPLE 1

An isotactic homopolypropylene resin (PP resin) containing 0.1 wt. % of stearic amide, 0.1 wt. % of silica, 0.1 wt. % of N,N-bis-hydroxyethylalkylamine and 0.4 wt. % of stearic acid monoglyceride and having an isotacticity of 97.5% and an intrinsic viscosity of 2.3 was fed to an extruder and heat-melted at 255° C. Further, an ethylene-propylene copolymer resin (EPC resin) containing 0.3 wt. % of oleic amide, 0.3 wt. % of silica and 3.7 wt. % of ethylene component and having and intrinsic viscosity of 1.7 was fed to two extruders separately and heat-melted at 275° C. Then, both PP and EPC resins were co-extruded in the form of film from the extruders in such a manner that the EPC resin was extruded on both sides of the PP resin. The extrudate was received on a cooling drum held at 25° C. The resulting resin film was stretched 4.6 times its original length in the longitudinal direction at 135° C. and also stretched 9 times its original width in the transverse direction at 165° C. Further, the resin film was subjected to a 7.8X heat relaxation treatment in the transverse direction at 160° C.

Only one side ("side B" hereinafter) of the biaxially oriented resin film thus obtained was subjected to a corona discharge treatment and was thereby set at a wet tension of 43 dyne/cm. Further, the biaxially stretched resin film after the corona discharge treatment was destaticized to adjust the amount of static electricity, using an ion blowing type destaticizer (BLT-800, a product of Kasuga Denki K.K.).

The thickness of the biaxially oriented resin film (a transfer metallizing film) was 25 μm, of which 21 μm was occupied by the PP resin film layer. The EPC resin film layers were each 2 μm thick. The biaxially oriented film was measured for surface roughness of the side ("side A" hereinafter) which had not been subjected to the corona discharge treatment, and also measured for O/C ratio and surface resistivity with respect to side A and side B.

Then, aluminum was vapor-deposited in a vacuum on both sides of the biaxially oriented resin film so as to give an optical density of 2.0. The vapor deposition of aluminum was performed first for the side A and thereafter side B. In this way there was prepared a transfer metallizing sheet.

COMPARATIVE EXAMPLE 1

A transfer metallizing film was prepared under the same conditions as in Example 1 except that the cooling drum temperature was set at 105° C. Then, using this sheet base, a transfer metallizing sheet was formed under the same conditions as in Example 1.

COMPARATIVE EXAMPLE 2

A transfer metallizing film was prepared under the same conditions as in Example 1 except that the wet tension of side A was set at 38 dyne/cm by the application of a corona discharge treatment thereto. Then, using this film, a transfer metallizing sheet was formed under the same conditions as in Example 1.

COMPARATIVE EXAMPLE 3

A transfer metallizing film was prepared under the same conditions as in Example 1 except that the corona discharge treatment for the side B was omitted. Then, using this film, a transfer metallizing sheet was formed under the same conditions as in Example 1.

COMPARATIVE EXAMPLE 4

A transfer metallizing film was prepared under the same conditions as in Example 1 except that the destaticizing treatment using the ion blowing type destaticizer was omitted. Then, using this film, a transfer metallizing sheet was formed under the same conditions as in Example 1.

COMPARATIVE EXAMPLE 5

A transfer metallizing film was prepared under the same conditions as in Example 1 except that the cooling drum temperature was set at 102° C. Then, using this film, a transfer metallizing sheet was formed.

COMPARATIVE EXAMPLE 6

A transfer metallizing film was prepared under the same conditions as in Comparative Example 2 except that the corona discharge treatment conditions for side A were changed to set the wet tension of side A at 34 dyne/cm. Then, using this film, a transfer metallizing sheet was formed under the same conditions as in Example 1.

EXAMPLE 2

A transfer metallizing film was prepared under the same conditions as in Example 1. Then, using this film, a transfer metallizing sheet was formed.

EXAMPLES 3, 4 and COMPARATIVE EXAMPLES 7, 8

Transfer metallizing films were prepared under the same conditions as in Example 1 except that the corona discharge treatment conditions for side B were changed. Then, using these films, there were prepared transfer metallizing sheets.

EXAMPLE 5 and COMPARATIVE EXAMPLE 9

Transfer metallizing films were prepared under the same conditions as in Example 1 except that the destaticizing treatment conditions using the ion blowing type destaticizer were changed. Then, using these films, there were prepared transfer metallizing sheets.

EXAMPLE 6

An isotactic polypropylene resin (PP resin) containing 0.1 wt. % of stearic amide, 0.1 wt. % of silica and 0.5 wt. % of quaternary stearylamine betaine and having an isotacticity of 97.5% and an intrinsic viscosity of 2.3 was fed to an extruder and heat-melted at 255° C. Separately, the same EPC resin as that used in Example 1 was fed to another extruder and heat-melted at 275° C. Then, both resins were co-extruded and laminated in the form of film. This laminate was received on a cooling drum held at 22° C. The resulting resin film was then subjected to the same biaxial stretching treatment as in Example 1 to obtain a biaxially oriented resin film.

For this resin film, a corona discharge treatment was applied to the EPC resin layer side (side B), and a destaticizing treatment was carried out using the same ion blowing type destaticizer as that used in Example 1. The thickness of the biaxially oriented resin film was 25 μm, of which 21 μm was occupied by the EPC resin layer.

Then, aluminum was vapor-deposited on the PP resin layer side (side A) of the biaxially oriented resin film (a transfer metallizing film) under the same conditions as in Example 1 to prepare a transfer metallizing sheet.

EXAMPLE 7

An isotactic polypropylene resin (PP resin) containing 0.1 wt. % of stearic amide and 0.1 wt. % of silica and having an isotacticity of 97.5% and an intrinsic viscosity of 2.3 was fed to an extruder and heat-melted at 265° C. Separately, an ethylene-propylene-butene copolymer resin (BPC resin) containing 0.3 wt. % of oleic amide, 0.3 wt. % of silica, as well as 3.5 wt. % and 5 wt. % of ethylene and buterie components, respectively, and having an intrinsic viscosity of 1.6, was fed to another extruder and heat-melted at 280° C. Both resins were received on a cooling drum held at 25° C. to afford a resin film. This resin film was subjected to the same biaxial stretching treatment as in Example 1. The thickness of the resulting biaxially oriented resin film was 20 μm, of which 3.5 μm was occupied by the BPC resin layer and 16.5 μm by the PP resin layer.

Then, a corona discharge treatment was applied to the PP resin layer side (side A) of the biaxially oriented resin film in a carbon dioxide atmosphere, and a destaticizing treatment was carried out using an ion blowing type destaticizer.

Next, aluminum was-vapor-deposited on side A of the biaxially oriented resin film (a transfer metallizing film) under the same conditions as in Example 1. Further, an aluminum deposition treatment was applied in a vacuum onto the aluminum deposited film on side A so as to give an optical density of 2.0. In this way there was prepared a transfer metallizing sheet. In this Example, a metal layer was not formed on the BPC resin layer side (side B).

EXAMPLE 8

An isotactic polypropylene resin (PP resin) containing 0.5 wt. % of betaine, 0.1 wt. % of stearic amide and 0.35 wt. % of silica and having an isotacticity of 97.5% and a viscosity of 2.5 was fed to an extruder and heat-melted at 280° C. The PP resin was then extruded in the form of film, which was received on a cooling drum held at 40° C. The resulting resin film was stretched 5 times its original length in the longitudinal direction at 140° C. and further stretched 9 times its original width in the transverse direction at 160° C. within a tenter, then heat-set at 150° C. The thickness of the resulting biaxially stretched resin film was 20 μm.

Only one side (side B) of the biaxially oriented film was subjected to a corona discharge treatment and was thereby set at a wet tension of 43 dyne/cm, and a destaticizing treatment was carried out using an ion blowing type destaticizer.

Then, under the same conditions as in Example 1, aluminum was vapor-deposited on both sides of the transfer metallizing film thus obtained, to prepare a transfer metallizing sheet.

TEST

With respect to the transfer metallizing films and transfer metallizing sheets obtained in the above Examples and Comparative Examples, the following measurements and tests were conducted. The results obtained are as shown in Table 2.

① Atomic Construction Ratio

Measured using ESCA-T50 manufactured by Shimazu Seisakusho, Ltd.

② Amount of Static Electricity of Film

Measured at a distance of 5 cm from film, using a static electricity measuring device, Electrostatic Locator (a product of Simco Japan Co.)

③ Gloss of Metallic Transfer Film

The gloss of the metallic transfer film in each transfer metalling sheet was measured at 60°–60° according to JIS-K-8471. The higher the value, the better the flatness. Values above 400% are preferable and values above 600% are more preferable.

④ Transferability of Metal Transfer Layer

A cellophane tape (a product of Nichiban Co., Ltd.) was stuck on each metal transfer layer and then peeled off. Then, the area over which the metal transfer layer was not transferred to the cellophane tape side but remained on the transfer metallizing sheet was determined by an image processing method. Judgement was made in accordance with the following criterion.

ps

TABLE 1

| Residual Area | Adhesion Index |
|---|---|
| over 95% (incl) | 5 |
| over 90% (incl) to 95% (excl) | 4 |
| over 75% (incl) to 90% (excl) | 3 |
| over 50% (incl) to 75% (excl) | 2 |
| below 50% (excl) | 1 |

As to the metal transfer layer, the smaller the adhesion index, the superior the transferability. Conversely, the larger the adhesion index, the superior the bonding force with film ⑤ Surface Resistivity of Film Measured using an ultra-insulation tester SM-10E (a product of Toa Electronics Ltd. ). A measured value smaller than 13 corresponds to the case where the amount of static electricity of film is below 5 kV.

TABLE 2

| | Transfer Metallizing Film | | | | | | | Transfer Metallizing Sheet | | |
|---|---|---|---|---|---|---|---|---|---|---|
| | | | O/C Ratio | | | Surface Resistivity (log Ω) | | | Adhesion Index | |
| No. | Layer Structure | Ra of Side A (μm) | Side A | Side B | Static Electricity (kV) | Side A | Side B | Gross of Transfer layer (%) | Side A | Side B |
| Ex. 1 | 3 layers | 0.07 | 0.020 | 0.340 | 1.5 | 12.8 | 11.4 | 660 | 1 | 3 |
| Ex. 2 | 3 layers | 0.04 | 0.020 | 0.340 | 1.5 | 12.7 | 11.4 | 752 | 1 | 3 |
| Ex. 3 | 3 layers | 0.07 | 0.020 | 0.120 | 1.5 | 12.5 | 11.6 | 631 | 1 | 3 |
| Ex. 4 | 3 layers | 0.07 | 0.020 | 0.480 | 1.5 | 12.5 | 11.6 | 631 | 1 | 4 |
| Ex. 5 | 3 layers | 0.07 | 0.020 | 0.340 | 4.7 | 12.8 | 11.4 | 655 | 1 | 3 |
| Ex. 6 | 2 layers | 0.05 | 0.020 | 0.340 | 1.5 | 12.9 | 12.0 | 661 | 1 | 3 |
| Ex. 7 | 2 layers | 0.08 | 0.025 | 0.450 | 2.2 | 12.8 | 12.8 | 685 | 2 | — |
| Ex. 8 | 1 layers | 0.05 | 0.020 | 0.350 | 2.0 | 12.5 | 11.6 | 710 | 1 | 3 |
| Com. Ex. 1 | 3 layers | 0.20 | 0.020 | 0.330 | 1.3 | 12.4 | 11.4 | 318 | 1 | 3 |
| Com. Ex. 2 | 3 layers | 0.06 | 0.34 | 0.330 | 1.6 | 12.9 | 11.4 | 657 | 3 | 3 |
| Com. Ex. 3 | 3 layers | 0.07 | 0.020 | 0.040 | 1.7 | 18.0 | 14.3 | 640 | 1 | 1 |
| Com. Ex. 4 | 3 layers | 0.08 | 0.020 | 0.340 | 7.2 | 14.0 | 11.6 | 652 | 1* | 3 |
| Com. Ex. 5 | 3 layers | 0.12 | 0.020 | 0.340 | 1.5 | 12.8 | 11.4 | 373 | 1 | 3 |
| Com. Ex. 6 | 2 layers | 0.07 | 0.040 | 0.340 | 1.5 | 12.9 | 11.5 | 658 | 1* | 3 |
| Com. Ex. 7 | 2 layers | 0.07 | 0.020 | 0.080 | 1.5 | 12.8 | 11.4 | 640 | 1 | 2 |
| Com. Ex. 8 | 1 layers | 0.07 | 0.020 | 0.520 | 1.5 | 12.5 | 11.6 | 622 | 1** | 4 |
| Com. Ex. 9 | 1 layers | 0.07 | 0.020 | 0.340 | 5.3 | 12.8 | 11.4 | 658 | 1* | 3 |

*thunder mark
**drop-out of film

What is claimed is:

1. A transfer metallizing film, constituted by a polypropylene resin film said transfer metallizing film not larger than 5 kV in the amount of static electricity, and having a transfer surface for releasable lamination thereto of a metal transfer layer, said transfer surface having a surface roughness set at a value of not larger than 0.1 μm and also having an atomic construction ratio of the number of oxygen atoms to that of carbon atoms within 10 nm from the surface of 0.0~0.03, and said transfer metallizing film having another surface opposite said transfer surface, said another surface having an atomic construction ratio of the number of oxygen atoms to that of carbon atoms within 10 nm from the surface of 0.1~0.5.

2. A transfer metallizing sheet comprising the transfer metallizing film recited in claim 1 and a metal transfer layer formed releasably on said transfer surface of the film.

3. A transfer metallizing film comprising a destaticized polypropylene resin film said transfer metallizing film having an amount of static electricity not larger than 5 kV and having a transfer surface for releasable lamination thereto of a metal transfer layer, said transfer surface having a surface roughness value not larger than 0.1 μm and an atomic construction ratio of the number of oxygen atoms to the number of carbon atoms within 10 nm from the surface of 0.0~0.03, and said transfer metallizing film having another surface opposite said transfer surface, said another surface having an atomic construction ratio of the number of oxygen atoms to the number of carbon atoms within 10 nm from the surface of 0.1~0.5.

4. A transfer metallizing sheet comprising the transfer metallizing film recited in claim 3 and a metal transfer layer formed releasably on said transfer surface of the film.

* * * * *